Jan. 18, 1938.  W. A. GRAHAM  2,105,858
TOASTING MACHINE
Filed Dec. 19, 1936   2 Sheets-Sheet 1
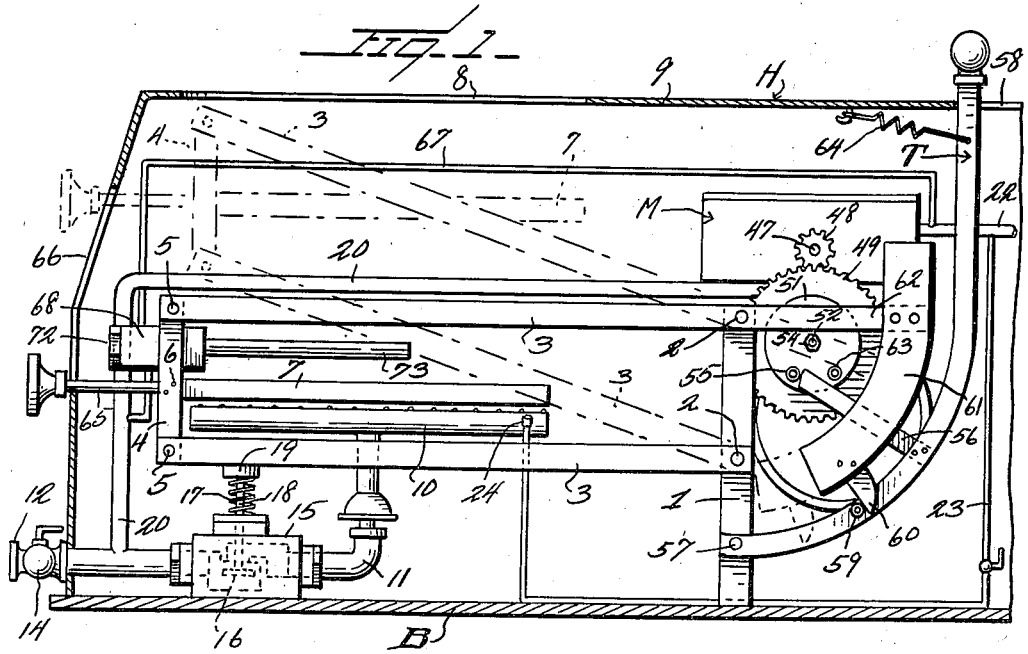
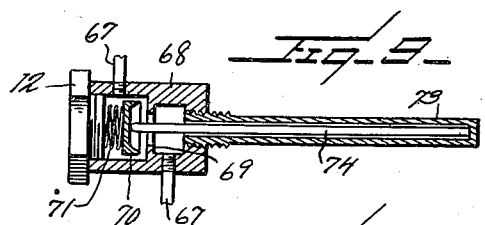
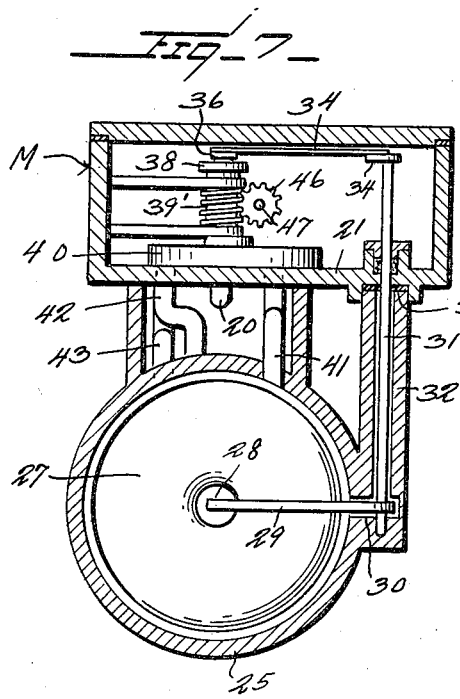
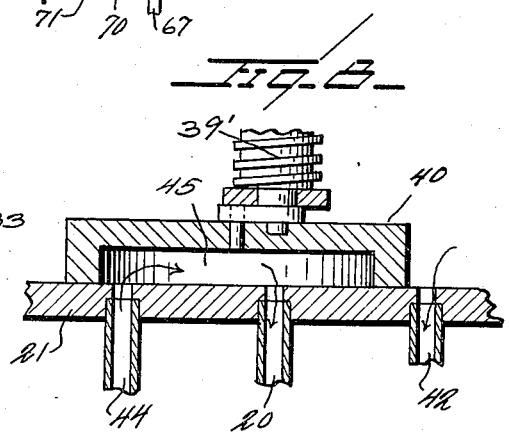
Inventor
W. A. Graham
By Watson E. Coleman
Attorney

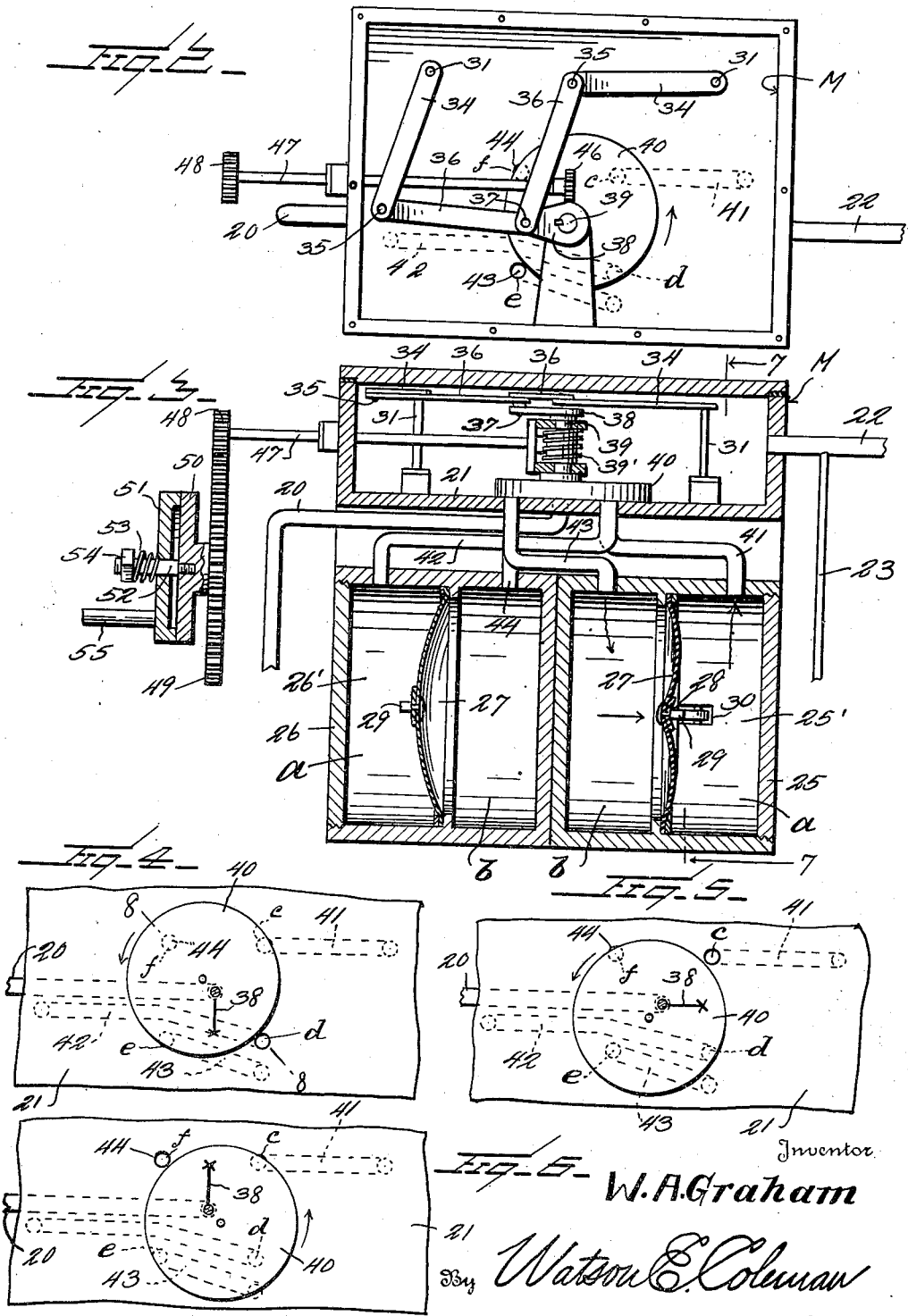

Patented Jan. 18, 1938

2,105,858

REISSUED

JAN 30 1940

UNITED STATES PATENT OFFICE 2,105,858

TOASTING MACHINE

William A. Graham, Houston, Tex.

Application December 19, 1936, Serial No. 116,830

16 Claims. (Cl. 53—5)

This invention relates to toasting machines, and it is primarily an object of the invention to provide a machine of this kind using a fluid fuel, preferably gas, under pressure and wherein means are provided under control of the fuel pressure for shutting off the supply of fuel to the burner after a predetermined period of time and also to effect a release of the bread or other food.

The invention also has for an object to provide a machine of this kind including a carriage supported for up and down movement with respect to the heating unit and wherein said carriage is provided with means for normally urging the same upwardly and wherein is also provided means for holding the carriage in its lowered position, together with a timing mechanism under control of the pressure of the fuel being delivered to the burner for releasing said holding means.

Another object of the invention is to provide a device of this kind comprising in its construction a carriage supported for movement into either an effective or ineffective position together with a timing mechanism for holding the same in effective position and wherein said timing mechanism operates under control of the fuel flowing to the burner comprised in the machine for releasing the carriage from its effective position after a predetermined period of toasting and at the same time shutting off the flow of fuel to the burner.

An additional object of the invention is to provide a toaster including a carriage supported for movement toward or from a heating element together with means for holding the same in effective position with respect to such element and wherein automatic means are provided under control of the flow of the fuel to the burner for automatically releasing the carriage from its effective position together with additional manual means operable at will for effecting such release of the carriage.

The invention has for a still further object to provide means under thermostatic control for initially creating the desired temperature.

The invention consists in the details of construction and in the combination and arrangement of the several parts of my improved toasting machine whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in vertical section with portions in elevation and of somewhat a diagrammatic character illustrating a toasting machine constructed in accordance with an embodiment of my invention;

Figure 2 is an enlarged view in top plan of a portion of the valve operating mechanism herein employed;

Figure 3 is an enlarged fragmentary view partly in section and partly in elevation illustrating in detail the motor structure and timing mechanism as herein embodied;

Figure 4 is a diagrammatic fragmentary view in plan showing the controlling valve for the motor in a second position from that illustrated in Figure 2;

Figure 5 is a view similar to Figure 4 illustrating a still further position of the valve;

Figure 6 is also a view similar to Figure 4 illustrating a still further position of the valve;

Figure 7 is a sectional view taken substantially on the line 7—7 of Figure 3;

Figure 8 is an enlarged fragmentary sectional view taken through the rotary valve as herein comprised with certain of the adjacent parts being shown in elevation;

Figure 9 is a detailed sectional view with parts in elevation illustrating the thermostatically operated valve as herein employed.

As disclosed in the accompanying drawings, B denotes a base carrying at its rear portion an upstanding post 1 of desired dimensions. Pivotally connected, as at 2, to the upper portion of the post 1 are the elongated parallel arms 3 of desired length and the mounting for which permitting the same to have swinging movement in an up and down direction. In Figure 1 these arms 3 are shown in their lowered position while their upper adjustment is indicated by broken lines. The forward end portions of these arms 3 are connected by the vertical arm 4 in parallelism at all times with the post 1. The extremities of this arm 4 are pivotally connected, as at 5, to the forward end portions of the arms 3, the pivots 5 being spaced apart the same distance as the pivots 2.

The central portion of the front vertical arm 4 has rigidly secured thereto, as indicated at 6, an end portion of a rearwardly disposed carriage 7 which is positioned below a slot 8 in the top wall 9 of the enclosing housing H which is suitably mounted upon the base B. It is to be stated that there may be provided in the top wall 9 of the housing H any desired number of slots 8 and that each of said slots 8 will have arranged therebelow the carriage 7 and for this reason it is thought that a detailed description of a single unit is sufficient for the purposes of disclosure.

When the carriage 7 is in its raised position as indicated by broken lines in Figure 1, the bread slice thereon will have been partially ejected up through the slot 8 to facilitate its removal, and when the carriage is in its lowermost position as illustrated by full lines in Figure 1, the bread slice supported by the carriage is in effective position to be properly toasted by the flame from the burner 10. The burner 10 may be of any preferred type capable of performing the work desired although it has been found of advantage to have this burner of an "H" design as by so doing a simple and convenient means is provided for assuring the desired toasting on both sides of the bread slice supported by the carriage 7. As this type of burner is well known a detailed description and illustration thereof is believed unnecessary.

The burner 10 has delivering thereto a supply line 11 which, if desired, may be coupled by a fitting 12 directly with a source of gas supply and particularly should it be desired to use the burner independently of the automatically operating mechanism to be hereinafter more particularly referred to. This fitting 12 includes a valve 14 whereby the direct connection of the line 11 with the source of fuel supply may be readily cut off.

Interposed in the line 11 is a valve structure 15 including a valve member 16 normally maintained in closed position by an expansible spring 17 herein disclosed as encircling an extended portion of the valve stem 18 and interposed between the casing of the valve structure and an enlargement 19 at the outer portion of the stem 18. This enlargement or head 19 is positioned for contact from above with the lower arm 3 when the carriage 7 is lowered with a resultant opening of the valve member 16 for the flow of fuel to the burner 10. The supply line 11 in advance of the valve structure 15 has in communication therewith a pipe line 20 leading from an enclosed manifold chamber M. The communication of the line 20 with the chamber M is through the bottom wall 21 thereof. The manifold chamber M has delivering therein a pipe line 22 leading from a suitable source of gas or other fluid fuel under pressure. This pipe line 22 in advance of the chamber M has leading therefrom a line 23 delivering to a pilot light 24 supported in required position with respect to the burner 10.

Positioned below the manifold chamber M are the enclosed members 25 and 26 providing respectively the compartments 25' and 26'. Each of these compartments 25' and 26' is intersected by a diaphragm 27 preferably of rubber whereby each of these compartments 25' and 26' is divided into two chambers $a$ and $b$. The central portion of the diaphragm 27 is fixed, as at 28, to the inserted end portion of a rock arm 29. This rock arm 29 extends within the chamber $a$ of a compartment 25' or 26' through a suitably positioned opening 30 provided in the wall of the member. This opening 30 is of a size to allow for the desired movement of the arm 29 which is fixed to move with a rock shaft 31 which extends upwardly and within the manifold chamber M. This shaft 31 between a member 25 or 26 and the bottom wall 21 of the manifold chamber M is enclosed within a surrounding sleeve 32 herein disclosed as integrally formed with the wall of a member 25 or 26 and having sealing engagement, as at 33, with the bottom wall 21 of the manifold chamber M. By this means escape of the gas or kindred fuel is prevented out through the opening 30.

The shafts 31, as particularly illustrated in Figure 2, have fixed to their end portions within the chamber M the rock arms 34, the outer or free end portions of which having pivotally connected thereto, as at 35, end portions of the rigid links 36. These links 36 in turn are operatively connected at a common pivot point 37 with a crank 38 carried by the upper portion of a worm shaft 39 suitably supported for rotation within the chamber M.

The rock arms 34 are in such relative angular relation as to assure the requisite push and pull through the links 36 upon the crank 38 to effect the desired rotation of the shaft 39 as the several shafts 31 are rocked. It is also to be noted that the rock arms 29 hereinbefore referred to travel in opposite directions although moving simultaneously when the machine is in operation, the extent of throw of the rock arms 29 in one direction depending upon the extent of looseness of the diaphragm. The movements of said rock arms 29 in the opposite direction are limited by contact of each of the rock arms 29 with the inner marginal edge portion of the slot or opening 30 through which the rock arm 29 is directed.

Fixed to and rotating with the shaft 39 is a disk valve member 40 having close contact with the inner face of the bottom wall 21 of the chamber M. This disk valve member 40 is eccentrically arranged with respect to the shaft 39, said valve member being of such radius and having a high point of throw that as the valve member 40 travels around with the shaft 39 the ports $c, d, e$ and $f$ in the bottom wall 21 of the chamber M will be opened in the proper sequence so that the gas or other fuel under pressure delivered within the chamber M will be properly discharged within the chambers $a$ and $b$ of the members 25 and 26 to effect the desired rocking movement of the arms 29. These ports $c, d, e$ and $f$ are equidistantly spaced from the axial center of the valve member 40 and also a distance in excess of the low point of the valve member 40. These ports $c, d, e$ and $f$ are also equidistantly spaced one with respect to the other. In the present embodiment of the invention the port $c$ is in communication with the chamber $a$ of the member 25 through the pipe line 41 while the port $d$ is in communication with the chamber $a$ of the member 26 through the pipe line 42. The port $e$ is in communication with the chamber $b$ of the member 25 through the pipe line 43 and the port $f$ is in communication with the chamber $b$ of the member 26 through the pipe line 44.

The valve member 40 as illustrated in Figure 8 has the major portion of its under face recessed to provide a valve chamber 45 with which the pipe line 20 is at all times in communication while three of the ports $c, d, e$ and $f$ are in communication with such chamber 45 when the fourth of such ports is open. It is also to be stated that there is one of these ports in communication at all times with the manifold chamber so that when gas or kindred fuel under pressure is admitted within the manifold chamber M there will be a substantially immediate functioning of the apparatus.

With the valve member 40 in the position as illustrated in Figures 2 and 3, the port $e$ is open and the gas under pressure within the manifold chamber M will pass out through this port $e$ and through the line 43 into the chamber $b$ of the member 25. The resultant expansion or dilation of the diaphragm 27 within said member 25 will force gas within the chamber $a$ out through the line 41 and port $c$ into the valve chamber 45 and through the line 20 to the burner 10. At the same time the rock lever 29 within said member 25 will be swung in a direction to effect push upon the crank 38 in a position to cause the valve member 40 to close the port $e$ and to open the port $d$. With the port $d$ open the gas will flow through the line 42 into the chamber $a$ of the member 26 and force the diaphragm 27 toward the chamber $b$ causing gas within the chamber $b$ of the member 26 to pass out through the pipe line 44 and through the port $f$ into the valve chamber 45 and from there through the line 20 to the burner. This movement of the diaphragm 27 in the member 26 and the associated rock arm 29 will cause the second link 36 to push the crank 38 a distance sufficient to close the port $d$ and to open the port $c$. With the port $c$ open the gas under pressure will flow from the chamber M through the pipe line 41 into the chamber $a$ of the member 25 and force the diaphragm 27 within said member 25 toward the chamber $b$. This movement of the diaphragm will force gas within such chamber $b$ out through the pipe line 43 into the valve chamber 45 and from this chamber 45 through the line 20 to the burner 10. Also during this movement of the diaphragm 27 within the member 25 the associated rock arm 29 will be moved in a direction to cause the first link 36 to impose pull upon the crank 38 sufficient to close the port $d$ and open the port $c$. With the port $c$ open the gas under pressure will pass through the line 41 into the chamber $a$ of the member 25 and force the diaphragm 27 within such member 25 toward the chamber $b$. During this movement of the diaphragm gas within said chamber $b$ will pass through the line 43 into the valve chamber 45 and from the chamber 45 through the line 20 to the burner 10. During this movement the rock arm 29 associated with such diaphragm will cause the first link 36 to impose pull upon the crank 38 sufficient to close the port $c$ and to open the port $f$. With the port $f$ open gas under pressure within the manifold chamber M will flow through the line 44 into the chamber $b$ of the member 26 and the diaphragm 27 within said member 26 forcing gas within the chamber $a$ out through the pipe line 42 into the valve chamber 45 and through the pipe line 20 to the burner. This movement of the diaphragm 27 will also move the associated rock arm 29 in a direction to cause the second link 36 to impose further pull upon the crank 38 sufficient to close the port $f$ and to open the port $e$ whereupon the cycles of operation will continue until the gas flow is completely shut off as by closing of the valve 16.

Mounted to rotate with the shaft 39 is a worm 39' which engages a worm wheel 46 fixed to a shaft 47 extending outwardly of the manifold chamber M. The extended portion of this shaft 47 has fixed thereto the pinion 48 meshing with the gear 49 suitably supported for desired rotation. As the shaft 39 is rotated under the action of the links 36 the gear 49 will also be caused to rotate at a desired speed. Fixed to rotate with the gear 49 about the same axis is a disk 50 herein disclosed as of a diameter materially less than that of the gear 49. Overlying the outer face of this disk 50 for frictional contact therewith is a second disk 51. This disk 51 is freely mounted upon a shank 52 extending outwardly from the axial center of the disk 50 and the disk 51 is maintained in desired frictional engagement with the disk 50 by the expansible member 53, herein disclosed as a coil spring of desired tension, interposed between the disk 51 and a nut 54 or other enlargement engaged with the outer end portion of the shank 52.

Extending outwardly and laterally from the disk 51 is an outstanding pin or lug 55 which, as the gear 49 rotates, comes into contact with the outer end of an arm 56 extending from an upstanding handle member T herein disclosed as having its lower extremity pivotally connected, as at 57, with the lower portion of the post 1.

This handle member T is of a length to extend above the top wall 9 of the housing H and for which purpose said top wall 9 is provided with a slot 58. As the gear 49 rotates and the pin or lug 55 contacts with the arm 56, the handle member T will be rocked a distance sufficient to release the holding member or lug 59 carried by the handle member or trigger T from a lug 60 depending from a weighted member 61. This weighted member 61 is carried by a rearwardly disposed extension 62 of the top arm 3 and when the lug 60 is released the weighted member 61 will cause the arms 3 together with the platform 7 to swing upwardly and at which time the valve 16 will immediately close, thus bringing to a stop the operation of the machine except the pilot light 24.

As the weighted member 61 moves downwardly the arm extension 62 has contact with the second pin or lug 63 rotating the friction disk 51 in a direction to return the pin or lug 55 to proper position for a succeeding operation of the machine.

As is believed to be obvious, the period through which a slice of bread or the like is subjected to the toasting action of the burner is dependent upon the time required to release the lug 60 under the action of the pin or lug 55. It is believed to be obvious that if it should be desired to stop the machine for any reason other than its regular operation, it will only be necessary to push the handle member or trigger T rearwardly. Figure 1 also discloses a retractile spring 64 secured to the handle or trigger T and the top wall 9 of the housing H for normally maintaining the handle member or trigger T in its raised or effective position.

The carriage 7 is herein disclosed as provided with a forwardly directed handle member 65 extending out through a suitably positioned slot 66 in the front wall of the housing H. This handle member 65 provides means whereby the carriage 7 may be readily lowered to start a toasting operation. It is believed to be obvious that as the carriage 7 is forced downwardly the lug 60 will readily ride over the holding member 59 for the purpose of proper engagement with the lug 60. The holding member 59 preferably includes a roller with the upper face of the lug 60 properly curved in a direction lengthwise thereof. Also when the carriage 7 is in its lowered position, the lower arm 3 will have proper contact with the head 19 to effect an opening of the valve 16 whereupon the motor action which includes the diaphragms 27 will effect the desired rotation of the shaft 39. In this connection it is to be stated that at no time is the toasting operation of the machine sufficient to effect a complete rotation of the disk 50.

In the initial use of the apparatus, the interior of the housing or oven as it may be called is cold and, as herein disclosed, a bypass 67 is provided connecting the supply pipe 22 from a point in advance of the manifold chamber M to the delivery pipe line 20, said bypass line 67 bridging the manifold chamber M permitting a direct flow of fuel to the burner when, of course, said bypass line 67 is open. Interposed in this bypass line 67 is the suitably positioned and supported casing 68 provided with an internal valve seat 69. Coacting with this valve seat 69 and positioned at the induction side thereof is a valve member 70 adapted to be forced into closed position by an expansible member 71 herein disclosed as a coil spring interposed between the valve member 70 and a plug 72 engaged within an end portion of the casing 68. Carried by and extending outwardly from the casing 68 is an elongated thermostatic element 73 preferably a copper tube closed at its outer end and having its bore communicating with the valve casing 68 at the eduction side of the valve seat 69. This thermostatic element or tube 73 is of a desired length to be expanded by the heat within the oven afforded by the housing H. Upon expansion of the element or tube 73 under an approximate predetermined degree of heat, the valve member 70 is in closed position with respect to its seat 68 so that is stopped the flow of fuel through the bypass line 67 to the burner.

Within the thermostatic element or tube 73 is a steel rod 74 of a length to have one end in contact with the outer closed end of a thermostatic element 73 with its other or inner end in contact with a valve member 70 so that as the thermostatic element or tube 73 contracts the valve member 70 will be moved into open position to permit flow of fuel through the bypass line 67 to the burner 10.

It is to be stated that it is not intended that the invention be limited to the use of the particular type of thermostat herein disclosed as it is within the province of the invention to employ any other thermostatic assembly which can be used. It is also to be further stated that while this thermostatic element is particularly desirable upon the initial use of the apparatus, it is equally desirable should for any reason the temperature within the housing or oven drop below the desired temperature during the use of the apparatus.

This application is a continuation in part of my application Serial No. 106,285 filed October 19, 1936.

From the foregoing description it is thought to be obvious that a toasting machine constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A toasting apparatus comprising, in combination, a gas burner, a fuel line for said burner leading from a source of fuel under pressure, a normally closed valve interposed in said line, a carriage for the article to be heated, means for supporting the carriage for movement toward or from the burner, said valve and supporting means for the carriage having coacting parts to open the valve for fuel flow to the burner when the carriage is substantially at the limit of its movement in one direction, releasable means for holding the carriage at such limit of its movement, and means under control of the fuel flowing through the fuel line for releasing said means to allow the carriage to move in the opposite direction to a second position.

2. A toasting apparatus comprising, in combination, a gas burner, a fuel line for said burner leading from a source of fuel under pressure, a normally closed valve interposed in said line, a carriage for the article to be heated, means for supporting the carriage for movement toward or from the burner, said valve and supporting means for the carriage having coacting parts to open the valve for fuel flow to the burner when the carriage is substantially at the limit of its movement in one direction, and timed means under control of the fuel flowing when said valve is open constructed and arranged to allow the carriage to move to its second position.

3. A toasting apparatus comprising, in combination, a gas burner, a fuel line for said burner leading from a source of fuel under pressure, a normally closed valve interposed in said line, a carriage for the article to be heated, means for supporting the carriage for movement toward or from the burner, said valve and supporting means for the carriage having coacting parts to open the valve for fuel flow to the burner when the carriage is substantially at the limit of its movement in one direction, releaseable means for holding the carriage in said position, timed means under control of the fuel during the operation of the burner to make the releaseable holding means ineffective, and means for moving the carriage to its second position upon said release of the carriage.

4. A toasting apparatus comprising, in combination, a gas burner, a fuel line for said burner leading from a source of fuel under pressure, a normally closed valve interposed in said line, a carriage for the article to be heated, means for supporting the carriage for movement toward or from the burner, said valve and supporting means for the carriage having coacting parts to open the valve for fuel flow to the burner when the carriage is substantially at the limit of its movement in one direction, timed means under control of the fuel flowing when said valve is open constructed and arranged to allow the carriage to move to its second position, a secondary fuel line for the burner, an automatically closing valve interposed in said secondary line, and thermostatic means associated with said second valve to maintain said valve open upon contraction of said thermostatic means.

5. A toasting apparatus comprising, in combination, a gas burner, a fuel line for said burner leading from a source of fuel under pressure, a normally closed valve interposed in said line, a carriage for the article to be heated, means for supporting the carriage for movement toward or from the burner, said valve and supporting means for the carriage having coacting parts to open the valve for fuel flow to the burner when the carriage is substantially at the limit of its movement in one direction, timed means under control of the fuel flowing when said valve is open constructed and arranged to allow the carriage to move to its second position, a secondary fuel line for the burner, an automatically closing valve interposed in said secondary line, and thermostatic means associated with said second named valve for holding said second valve open when the surrounding temperature is below a predetermined degree, said thermostatic means allowing the said second valve to close when the surrounding temperature reaches such predetermined degree.

6. A toasting apparatus comprising, in combination, a gas burner, a carriage for the article to be heated, means for supporting the carriage for movement toward or from the burner, means for holding the carriage in one of said positions, timed means operated by the pressure of the fuel for releasing said means to allow the carriage to move to its second position, and means for delivering to the burner the fuel exhausted from the timed means.

7. A toasting apparatus comprising, in combination, a gas burner, a carriage for the article to be heated, means for supporting the carriage for movement toward or from the burner, means for holding the carriage in one of said positions, timed means operated by the pressure of the fuel for releasing said means to allow the carriage to move to its second position, and means for delivering to the burner the fuel exhausted from the timed means, said timed means being inoperative when the delivery of the exhausted fuel is stopped.

8. A toasting apparatus comprising, in combination, a gas burner, a carriage for the article to be heated, means for supporting the carriage for movement toward or from the burner, means for holding the carriage in one of said positions, timed means operated by the pressure of the fuel for releasing said means to allow the carriage to move to its second position, means for delivering to the burner the fuel exhausted from the timed means, and automatic means for stopping said delivery when the carriage is in its second position.

9. A toasting apparatus comprising, in combination, a gas burner, a carriage for the article to be heated, means for supporting the carriage for movement toward or from the burner, means for holding the carriage in one of said positions, timed means operated by the pressure of the fuel for releasing said means to allow the carriage to move to its second position, means for delivering to the burner the fuel exhausted from the timed means, automatic means for stopping said delivery when the carriage is in its second position, and means operating automatically to allow said delivery when the carriage is in its first position.

10. A toasting apparatus comprising, in combination, a gas burner, a fuel line for said burner leading from a source of fuel under pressure, a normally closed valve interposed in said line, a carriage for the article to be heated, means for supporting the carriage for movement toward or from the burner, said valve and supporting means for the carriage having coacting parts to open the valve for fuel flow to the burner when the carriage is substantially at the limit of its movement in one direction, timed means under control of the fuel flowing when said valve is open constructed and arranged to allow the carriage to move to its second position, and means operable at will and independently of the timed means to allow the carriage to move to its second position.

11. A toasting apparatus comprising, in combination, a gas burner, a fuel line for said burner, a normally closed valve interposed in said line, a carriage for the article to be heated, means for supporting the carriage for movement toward or from the burner including an arm, means for mounting the arm for swinging movement, a weighted member carried by the arm for swinging the arm and the carriage away from the burner, releasable means for holding the arm against such swinging movement when the arm is at the limit of its movement toward the burner, timed means for making said releaseable means ineffective, said arm when in its second position operatively engaging the valve to maintain the valve in open position, and a motor for working the timed means operated by the pressure of the fuel.

12. A toasting apparatus comprising, in combination, a gas burner, a fuel line for said burner, a normally closed valve interposed in said line, a carriage for the article to be heated, means for supporting the carriage for movement toward or from the burner including an arm, means for mounting the arm for swinging movement, a weighted member carried by the arm for swinging the arm and the carriage away from the burner, releaseable means for holding the arm against such swinging movement when the arm is at the limit of its movement toward the burner, a shaft, means for rotating the shaft during the period the valve in the fuel line is open, said means being inactive when said valve is closed, a rotatable disk in driven connection with said shaft, a second disk carried by the first disk for independent rotation, means for normally maintaining said disks in frictional contact for unitary rotation, a lug carried by the second disk, a trigger member releaseably engaging the arm to hold the arm in its second position and including a part with which the lug contacts upon rotation of the disks for releasing the trigger member from holding engagement with the arm.

13. A toasting apparatus comprising, in combination, a gas burner, a fuel line for said burner, a normally closed valve interposed in said line, a carriage for the article to be heated, means for supporting the carriage for movement toward or from the burner including an arm, means for mounting the arm for swinging movement, a weighted member carried by the arm for swinging the arm and the carriage away from the burner, releasable means for holding the arm against such swinging movement when the arm is at the limit of its movement toward the burner, a shaft, means for rotating the shaft during the period the valve in the fuel line is open, said means being inactive when said valve is closed, a rotatable disk in driven connection with said shaft, a second disk carried by the first disk for independent rotation, means for normally maintaining said disks in frictional contact for unitary rotation, a lug carried by the second disk, a trigger member releasably engaging the arm to hold the arm in its second position and including a part with which the lug contacts upon rotation of the disks for releasing the trigger member from holding engagement with the arm, and a member carried by the second disk engaged by the arm as the arm moves to its first position to reversely rotate the second disk sufficiently to return the lug into position for a succeeding operation.

14. A toasting apparatus comprising, in combination, a burner, a carriage, means for supporting the carriage for movement toward or from the burner, a manifold chamber, a pipe line leading from the manifold chamber to the burner, said manifold chamber being for communication with a source of fuel under pressure, a pair of closed compartments, a diaphragm within each of said compartments dividing the same into two chambers, a pipe line in communication with each of said chambers and with the manifold chamber, a valve member within the manifold chamber for opening and closing the several pipe lines in proper sequence, means for operating said valve member, a mechanism operating as pressure in proper sequence is imposed upon opposite sides of the diaphragms for moving the valve member to open in proper sequence the several lines from the chambers, said valve member being constructed to allow the fuel as exhausted from the several chambers of the compartments to flow to the burner, a shaft extending within the manifold chamber, an operative connection between the shaft and the valve member within the manifold chamber for rotating the shaft during the period of movement of the valve member, releasable means for holding the carriage in one of its positions, and timed means operating from the shaft for making said releasable means ineffective.

15. A toasting apparatus comprising, in combination, a burner, a carriage, means for supporting the carriage for movement toward or from the burner, a manifold chamber, a pipe line leading from the manifold chamber to the burner, said manifold chamber being for communication with a source of fuel under pressure, a pair of closed compartments, a diaphragm within each of said compartments dividing the same into two chambers, a pipe line in communication with each of said chambers and with the manifold chamber, a valve member within the manifold chamber for opening and closing the several pipe lines in proper sequence, said valve member having one face open to provide a chamber, the pipe line leading to the burner being at all times in communication with said chamber and the ports closed by said valve member being also in communication with said chamber, a shaft within the manifold chamber, the ports being concentrically spaced around said shaft, the valve member being eccentrically mounted upon the shaft, a mechanism operating as pressure in proper sequence is imposed upon opposite sides of the diaphragms for rotating the shaft and valve member to open in proper sequence the several lines from the chambers, the chamber of the valve member allowing the fuel as exhausted from the several chambers of the compartments to flow to the burner, releaseable means for holding the carriage in one of its positions, and timed means operating from the shaft for making said releasable means ineffective.

16. A toasting apparatus comprising, in combination, a burner, a carriage, means for supporting the carriage for movement toward or from the burner, a manifold chamber, a pipe line leading from the manifold chamber to the burner, said manifold chamber being for communication with a source of fuel under pressure, a pair of closed compartments, a diaphragm within each of said compartments dividing the same into two chambers, a pipe line in communication with each of said chambers and with the manifold chamber, a valve member within the manifold chamber for opening and closing the several pipe lines in proper sequence, means for operating said valve member, a shaft within the manifold chamber, the communications between said manifold chamber and the pipe lines leading therefrom to the chambers of the compartments being concentrically spaced around the shaft, the valve member being eccentrically mounted upon the shaft, rock shafts extending within the manifold chamber, rock arms carried by the shafts and extending within the compartments, means for securing the rock arms to the diaphragms within the compartments whereby said rock shafts are operated upon movements of the diaphragms, rock arms carried by said rock shafts within the manifold chamber, links operatively connecting the rock arms within the manifold chamber and the crank of the shaft whereby push and pull is imposed upon the crank in proper sequence to rotate the shaft and valve member carried thereby, releasable means for holding the carriage in one of its positions, and timed means operating from the shaft within the manifold chamber and as rotated from the diaphragms for making said releasable means ineffective.

WILLIAM A. GRAHAM.